UNITED STATES PATENT OFFICE.

EDGAR A. LEAKE, OF LAWRENCE, MASSACHUSETTS.

POLISHING COMPOSITION.

1,356,075.     Specification of Letters Patent.     Patented Oct. 19, 1920.

No Drawing.     Application filed September 30, 1919. Serial No. 327,559.

*To all whom it may concern:*

Be it known that I, EDGAR A. LEAKE, a citizen of the United States, residing at Lawrence, in the county of Essex and State of Massachusetts, have invented certain new and useful Improvements in Polishing Compositions, of which the following is a specification.

My invention relates to new and useful improvements in polishing compositions and the object of my invention is to provide a composition particularly adapted for polishing varnished woodwork such as furniture and the like.

The preferred formula for my furniture polish is as follows:

| | |
|---|---|
| Linseed oil | 22.7% |
| Hydrochloric acid | 1.5% |
| Alcohol | 5 % |
| Antimony trichlorid | 4.5% |
| Acetic acid dilute | 62 % |
| Methyl orange solution | .8% |
| Oil of mirbane, artificial | 3.5% |

In mixing or compounding the above formula the various ingredients are added in the order set down above and the whole is then agitated for several minutes to insure a thorough mixing.

The linseed oil employed constitutes the base of the composition, while the alcohol, which may be either wood or grain alcohol, acts as a drying agent. The acetic acid is employed as a cleansing agent to remove grease and the like from the wood or other surface being polished. The hydrochloric acid and the antimony trichlorid are employed in conjunction with each other to unite the various ingredients above named to form a creamy solution, the hydrochloric acid serving also as a solvent for the antimony trichlorid. If desired, the methyl orange may be omitted from the composition.

The above polishing composition is not only effective as a wood polisher, but also for polishing various enameled surfaces, having been found particularly useful for polishing the enameled surfaces of automobiles.

Having thus described the invention, what is claimed as new is:

A polish including linseed oil 22.7 per cent., hydrochloric acid 1.5 per cent., alcohol 5 per cent., antimony trichlorid 4.5 per cent., acetic acid 62 per cent. and methyl orange .8 per cent.

In testimony whereof I affix my signature.

EDGAR A. LEAKE. [L. S.]